March 30, 1943.  C. G. KRONMILLER ET AL  2,315,212
CONTROL APPARATUS
Filed Aug. 25, 1937  2 Sheets-Sheet 1
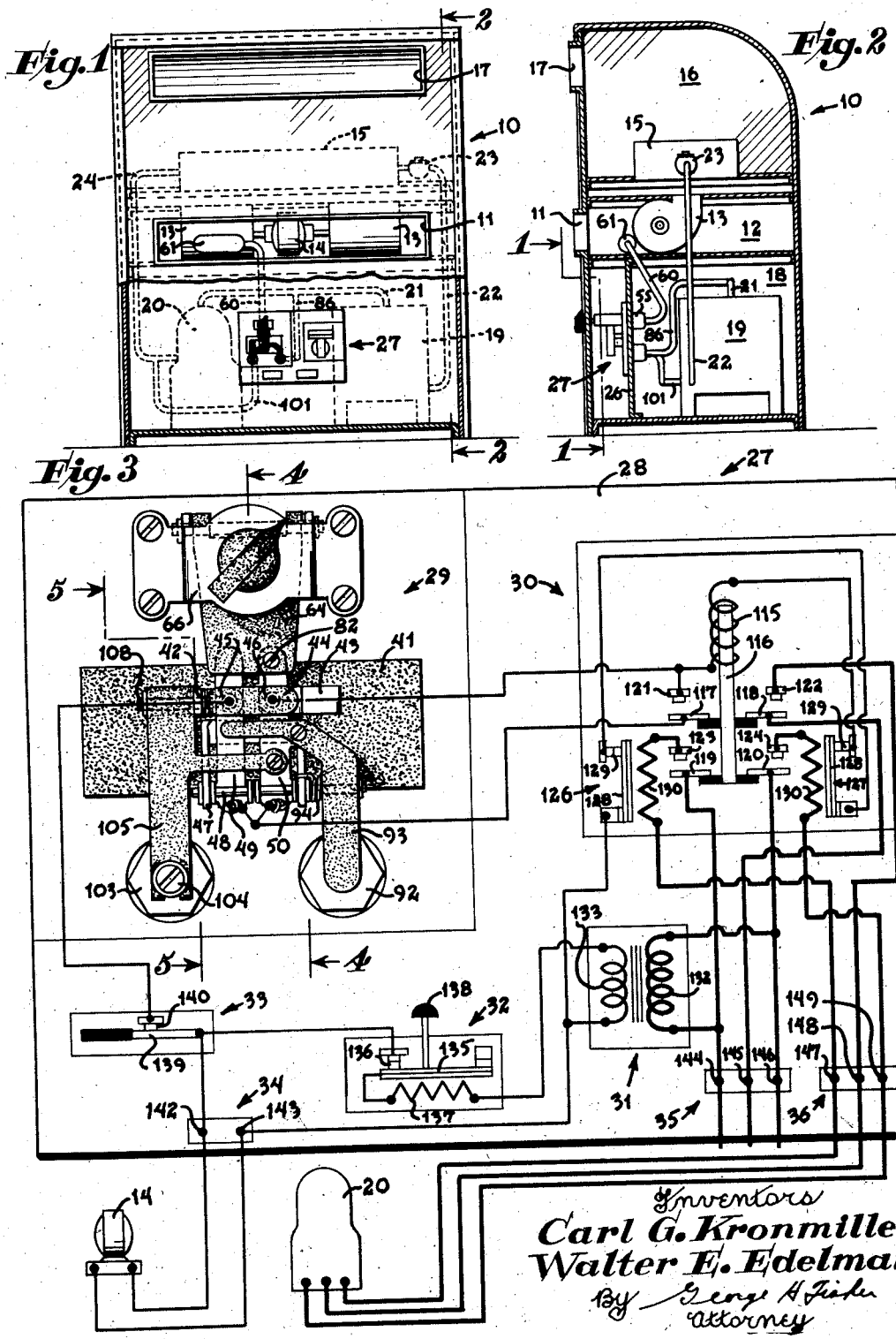
Inventors
Carl G. Kronmiller
Walter E. Edelman
By George H. Fisher
Attorney March 30, 1943. C. G. KRONMILLER ET AL 2,315,212
CONTROL APPARATUS
Filed Aug. 25, 1937 2 Sheets-Sheet 2

Inventors
Carl G. Kronmiller
Walter E. Edelman
By George H Fisher
Attorney

Patented Mar. 30, 1943

2,315,212

UNITED STATES PATENT OFFICE 2,315,212

CONTROL APPARATUS

Carl G. Kronmiller and Walter E. Edelman, Minneapolis, Minn., assignors to Minneapolis-Honeywell Regulator Company, Minneapolis, Minn., a corporation of Delaware Application August 25, 1937, Serial No. 160,846

25 Claims. (Cl. 62—4)

This invention relates to a control apparatus generally and more particularly to a control apparatus for use in an air conditioning system.

An object of this invention is to provide a novel control apparatus which may take the form of a switching mechanism operated in response to a plurality of variable conditions.

A further object of this invention is to provide a novel control apparatus for use in connection with an air conditioning system utilizing a mechanical refrigeration apparatus which may take the form of a switching mechanism operated in response to a plurality of variable conditions such as temperature, suction pressure and high pressure.

Further objects of this invention reside in the details of construction and operation of the control apparatus.

Other objects and advantages will become apparent to those skilled in the art upon reference to the accompanying specification, claims and drawings.

Figure 4:
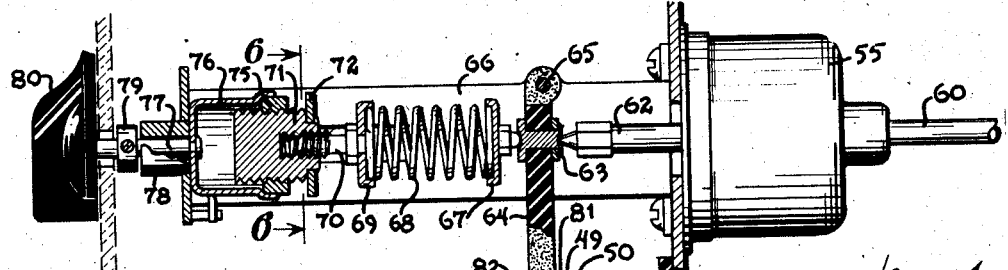
Figure 6:
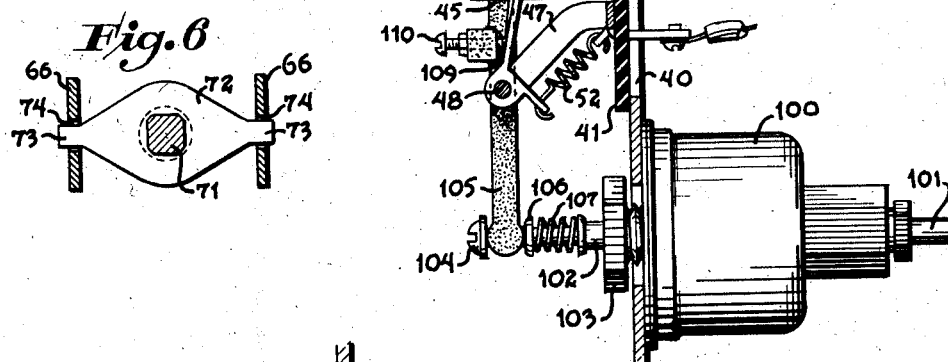
Figure 5:
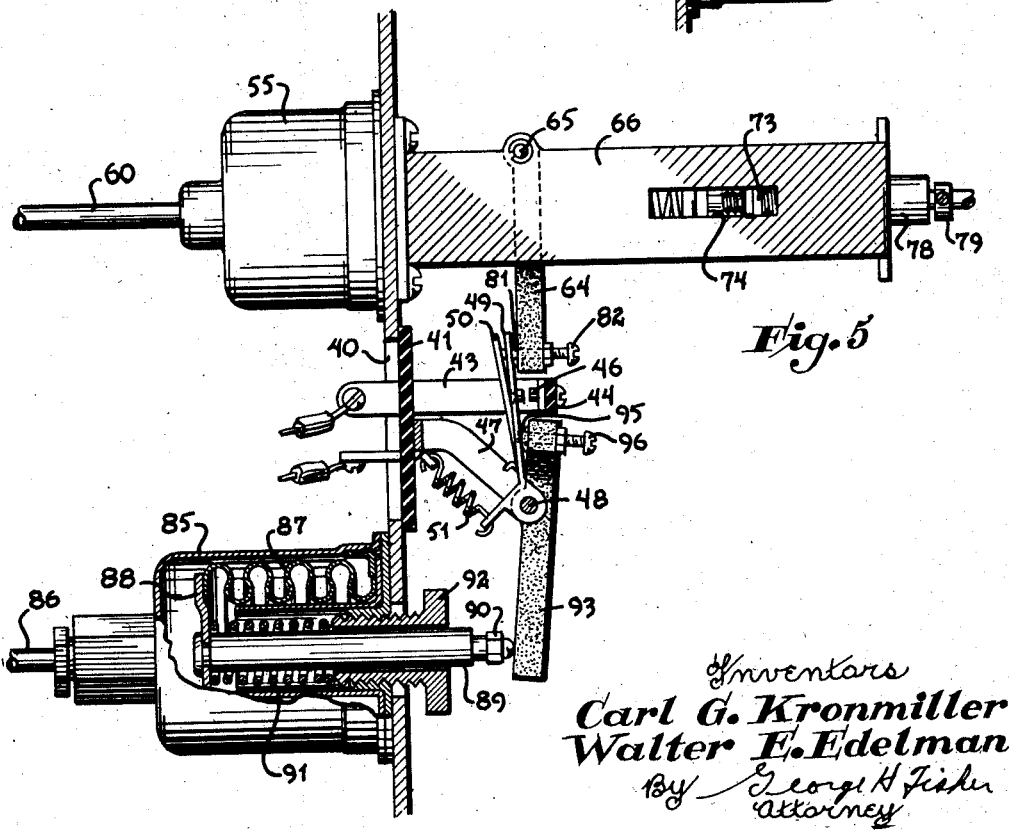

For a more thorough understanding of this invention reference is made to the accompanying drawings, in which:

Figure 1 is a partial sectional view of an air conditioning apparatus taken substantially along the line 1—1 of Figure 2, Figure 2 is a vertical sectional view of the air conditioning apparatus taken substantially along the line 2—2 of Figure 1, Figure 3 is an enlarged diagrammatic view of the control apparatus of this invention, Figure 4 is a sectional view taken substantially along the line 4—4 of Figure 3 and looking from the right, Figure 5 is a sectional view taken substantially along the line 5—5 of Figure 3 and looking from the left, and Figure 6 is a sectional view taken substantially along the line 6—6 of Figure 4.

The control apparatus of this invention is shown for purposes of illustration as applied to an air conditioning apparatus of the type shown and described in application Serial No. 147,694 filed June 11, 1937 by Leo B. Miller and William L. McGrath.

Referring now to Figures 1 and 2, an air conditioning apparatus is generally designated at 10 for conditioning the air of a space. The air conditioning apparatus is provided with a return air opening 11 which leads to a return air chamber 12. Located in the return air chamber 12 are fans 13 operated by an electric motor 14 for forcing return air over a cooling coil 15 into a delivery chamber 16. Cooled air is conducted from the delivery chamber 16 through an opening 17 to the space to be conditioned. The cooling coil 15 is illustrated as being of the direct expansion type. Located below the return air chamber 12 is a chamber 18 which encloses a mechanical refrigerating apparatus. The mechanical refrigerating apparatus is shown to include a condenser 19 and a compressor 20. Compressed refrigerant is discharged by the compressor 20 through a high pressure pipe 21 into the condenser 19 where it is liquified. Condensed refrigerant passes through a liquid line 22 and an expansion valve 23 into the direct expansion coil 15. Expanded refrigerant is withdrawn from the direct expansion coil 15 through a suction pipe 24 by the compressor 20. Since this mechanical refrigerating apparatus is conventional a further description thereof is not considered necessary.

Also located in the chamber 18 is a partition 26 upon which is mounted the control apparatus of this invention and generally designated at 27. Referring now to Figure 3 the control apparatus 27 is shown to comprise a common mounting structure or panel 28 upon which is mounted a switching mechanism generally designated at 29, a relay or starter generally designated at 30, a transformer generally designated at 31, a combined overload and manual switch generally designated at 32, a manual switch 33 and three terminal blocks 34, 35, and 36.

Referring now to Figures 3, 4, and 5 the panel 28 is provided with an opening 40 over which extends an insulating block 41. Brackets 42 and 43 are secured to the insulating block 41 and are tied together and braced at their outer extremities by means of an insulating link 44. The brackets 42 and 43 carry, respectively, contacts 45 and 46 and the brackets 42 and 43 extend through the insulating block 43 to form a simple means for fastening lead wires thereto as is clearly illustrated in Figures 4 and 5. A U-shaped bracket 47 is also secured to the insulating block 41 and extends through the block 41 to form a means for readily attaching lead wires thereto. The U-shaped bracket 47 carries a pivot pin 48 upon which are mounted switch arms 49 and 50. The switch arms 49 and 50 carry contacts which are adapted to engage the stationary contacts 45 and 46, respectively. The switch arms 49 and 50 are at all times urged into engagement with their respective stationary contacts 45 and 46 by means of springs 51 and 52 as illustrated in Figures 4 and 5.

A bellows assembly 55 is connected by a capillary tube 60 to a bulb 61 located in the return air chamber 12. The bulb 61, the tube 60, and the bellows assembly 55 are charged with a volatile fluid so that the bellows assembly 55 is operated in accordance with changes in temperature in the return air chamber 12. The bellows assembly 55 operates a plunger 62 which engages an abutment 63 carried by a lever 64 pivoted at 65 to a U-shaped support 66. Lever 64 is preferably made of insulating material. A spring retainer cup 67 is engaged by one end of a compression spring 68 and the other end of compression spring 68 engages a cup 69.

The cup 69 is carried by a stud 70 which is screw threadedly secured in a screw member 71. Rigidly secured to the screw member 71 is a plate 72 provided with ears 73 extending into slots 74 of the U-shaped support 66 as illustrated in Figure 6. The plate 72 therefore prevents rotation of the screw member 71. Screw threadedly engaging the screw member 71 is a nut 75 which is rigidly secured to a cup 76 which abuts the closed end of the U-shaped support 66. The cup 76 is rigidly secured to a shaft 77 which extends outwardly through a bearing 78 carried by the support 66. A collar 79 fastened to the shaft 77 prevents longitudinal movement of the shaft 77 and a handle 80 fastened to the shaft 77 provides a means for rotating the shaft 77. It will be apparent that rotation of the handle 80 and consequently the nut 75 causes reciprocation of the screw member 71 and hence reciprocation of cup 69. In this manner the compression in the spring 68 may be varied. Since the spring 68 opposes operation of the bellows assembly 55 the temperature setting of this portion of the switching mechanism may be adjusted at will by suitably rotating the handle 80. Stud 70 provides a means for factory calibrating this portion of the instrument.

The lever 64 is provided with an abutment 81 which is adapted to engage the switch arm 49 and the lever 64 is also provided with a screw 82 which is adapted to engage the switch arm 50. Upon an increase in temperature affecting the bulb 61, the plunger 62 moves to the left against the action of spring 68 to move the abutment 81 and the screw 82 toward the left to allow the springs 51 and 52 to move the switch arms 49 and 50 into engagement with the contacts 45 and 46, respectively. The parts are preferably arranged so that the switch arm 49 is moved into engagement with the contact 45 before the switch arm 50 is moved into engagement with the contact 46 and this differential may be adjusted by adjusting the screw 82. For purposes of illustration it is assumed that the switch arm 49 engages the contact 45 when the return air temperature rises to 73° and the switch arm 50 engages the contact 46 when the return air temperature rises to 75°. Conversely when the return air temperature decreases to 75° the switch arm 50 is moved out of engagement with the contact 46 and when the return air temperature decreases to 73° the switch arm 49 is moved out of engagement with the contact 45.

Referring now particularly to Figures 3 and 5, a bellows assembly 85 is connected by a pipe 86 to the high pressure pipe 21 of the mechanical refrigerating apparatus. The bellows assembly 85 includes a bellows 87 secured to a plate 88. A plunger 89 carrying an adjustable abutment 90 is carried by the plate 88. A spring 91 urges the plate 88 toward the left and the compression of this spring may be adjusted by an adjusting nut 92. The abutment 90 is adapted to engage a pivoted lever 93 preferably made of insulating material. The pivoted lever 93 is pivoted upon the pivot pin 48 and a spring 94 (Figure 3) at all times urges the lever 93 into engagement with the abutment 90. The lever 93 carries an abutment 95 which is adapted to engage the switch arm 49 and also carries an adjustable screw 96 which is adapted to engage the switch arm 50. With the parts in the position shown in Figure 5 a decrease in high pressure allows the spring 91 to move the abutment 90 toward the left which allows clockwise rotation of the lever 93 to permit the switch arm 49 to engage the contact 45 and the switch arm 50 to engage the contact 46. The parts are preferably arranged so that the switch arm 49 engages the contact 45 before the switch arm 50 engages the contact 46. The differential in operation may be adjusted by suitably adjusting the screw 96. As pointed out above the pressure setting of the bellows assembly 85 may be adjusted by adjusting the nut 92. For purposes of illustration it is assumed that upon an increase in high pressure the switch arm 50 is moved out of engagement with the contact 46 when the pressure rises to 135 pounds and the switch arm 49 is moved out of engagement with the contact 45 when the pressure rises to 185 pounds. Conversely when the pressure decreases to 185 pounds the switch arm 49 moves into engagement with the contact 45 and when the pressure decreases to 135 pounds the switch arm 50 moves into engagement with the contact 46.

Referring now to Figures 3 and 4 a bellows assembly 100 is connected by a pipe 101 to the suction pressure line 24. The bellows assembly 100 operates a plunger 102 and the pressure setting of the bellows assembly 100 may be adjusted by the adjusting nut 103. A screw 104 is screw threadedly mounted in the plunger 102 and one end of a pivoted lever 105 preferably made of insulating material is held between the head of the screw 104 and a collar 106 urged outwardly by a spring 107. The lever 105 is pivoted on a pin 108 carried by the bracket 42. The lever 105 is provided with an abutment 109 which is adapted to engage the switch arm 49 and a screw 110 which is adapted to engage the switch arm 50. Upon an increase in suction pressure the lever 105 is rotated in a clockwise direction to allow the switch arm 49 to engage the contact 45 and the switch arm 50 to engage the contact 46. For purposes of illustration it is assumed that the switch arm 49 engages the contact 45 when the suction pressure rises to 20 pounds and the switch arm 50 engages the contact 46 when the suction pressure rises to 50 pounds. Conversely when the suction pressure decreases to 50 pounds the switch arm 50 is moved out of engagement with the contact 46 and when the suction pressure decreases to 20 pounds the switch arm 49 is moved out of engagement with the contact 45.

From the above it is seen that all of the bellows assemblies 55, 85, and 100 operate on the switch arms 49 and 50. It follows then that the switch arm 49 can engage the contact 45 only if the space or return air temperature is above 73°, the suction pressure is above 20 pounds and the high pressure is below 185 pounds. Likewise the switch arm 50 may engage the contact 46 only if the space or return air temperature is above 75°, the suction pressure is above 50 pounds and the high pressure is below 135 pounds. In other words, if the space temperature should decrease below 73° or if the suction pressure should decrease below 20 pounds, or if the high pressure should increase above 185 pounds, the switch arm 49 will be moved out of engagement with the contact 45. Likewise if the space or return air temperature should decrease below 75°, the suction pressure decrease below 50 pounds, or the high pressure increase above 135 pounds, switch arm 50 will be moved out of engagement with the contact 46.

The relay generally designated at 30 may comprise a relay coil 115 for operating an armature 116 which operates switch arms 117, 118, 119, and 120 with respect to stationary contacts 121, 122, 123, and 124, respectively. The switch arm 117 and contact 121 perform a maintaining or holding function while the switch arms 118, 119, and 120 and the contacts 122, 123, and 124 provide load switches for the compressor motor 20. If desired the relay 30 may include overload cut-out switching mechanisms generally designated at 126 and 127. Each of these overload cut-out mechanisms may include a bimetallic element 128 for operating contacts 129, the bimetallic element being heated by a heater 130 located in the compressor circuit. The arrangement is such that when the current flowing through the heaters 130 reaches a predetermined high value the bimetallic elements 128 are flexed to open the contacts 129. Suitable latching mechanism may be provided for maintaining the contacts 129 separated upon the occurrence of overload conditions whereupon manual resetting would be necessary. Since such a construction is old in the art the overload cut-out switching mechanisms 126 and 127 have only been diagrammatically shown.

The step-down transformer 31 carried by the panel 28 is shown to comprise a primary 132 and a secondary 133. The combined manual and overload cut-out switching mechanism 32 is shown to comprise a bimetallic element 135 for operating contacts 136. The bimetallic element 135 is heated by a heater 137 the arrangement being such that when an overload condition occurs the heater 137 flexes the bimetallic element 135 to open the contacts 136. Suitable latching mechanism may be provided for requiring resetting of the switching mechanism upon the occurrence of overload conditions. An operating handle 138 is also provided for manually operating the contacts 136. The switch 33 which places the control system for the relay or starter 30 into or out of operation is shown to comprise a manually operated switch arm 139 and a stationary contact 140. The terminal block 34 includes terminals 142 and 143, the terminal block 35 includes terminals 144, 145, and 146 and the terminal block 36 includes terminals 147, 148, and 149.

The terminals 144, 145, and 146 of the terminal block 35 are shown to be connected to a three-phase source of power. The terminals 147, 148, and 149 are suitably connected to the compressor motor 20 and the terminals 142 and 143 are suitably connected to the fan motor 14. Whenever the relay coil 115 of the starter or relay 30 is energized to move the switch arms 117, 118, 119, and 120 into engagement with the contacts 121, 122, 123, and 124, respectively, the compressor motor 20 is connected to the source of power. The heaters 130 of the overload cut-out switching mechanisms 126 and 127 are included in two of the phase connections leading from the source of power to the compressor motor 20 so that if an overload condition exists in any of the phase circuits the contact 129 of the overload cut-out switching mechanisms are opened. The primary 132 of the step-down transformer 131 is connected across the terminals 144 and 146 so that power is at all times supplied to the step-down transformer 31.

Closure of the contacts 136 of the combined overload and manual switch 32 completes a circuit from the secondary 133 through heater 137, contacts 136, terminal 142, fan motor 14, and terminal 143 back to the secondary 133. Completion of this circuit causes operation of the fans 13 to deliver conditioned air to the space to be conditioned. If an overload condition exists within the fan circuit the contacts 136 are separated to shut down the fan motor 14 whereby overload protection is provided. When the switch arm 139 of the manual switch 33 engages the contact 140, power is supplied to the operating coil 115 of the relay 30 and this supply of power passes through the heater 137 and contacts 136 of the combined manual and overload cut-out switch 32. Therefore if the contacts 136 are separated, the supply of power to the relay or starter 30 is interrupted even though the switch 33 is closed. Therefore it is impossible to operate the relay 30 in case the fan motor 14 is not operating.

Assume now that the space temperature rises to 75°, that the suction pressure rises to 50 pounds and that the high pressure is below 135 pounds. The switch arms 49 and 50 are thereupon moved into engagement with their respective contacts 45 and 46. A circuit is thereupon completed from the secondary 133 through heater 137, contacts 136, switch arm 139, contact 140, contact 45, switch arm 49, switch arm 50, contact 46, relay coil 115, contacts 129 and bimetallic element 128 of the overload cut-out switching mechanism 127 and contacts 129 and bimetallic element 128 of the overload cut-out switching mechanism 126 back to the secondary 133. Completion of this circuit energizes the relay coil 115 to move the switch arms 117, 118, 119, and 120 into engagement with the contacts 121, 122, 123, and 124, respectively. The compressor motor is thereupon placed in operation. When the starter or relay 30 is thus pulled in to cause switch arm 117 to engage the stationary contact 121 a maintaining circuit for the relay coil 115 is completed which shunts out switch arm 50 and contact 46. This maintaining circuit may be traced from the secondary 133 through heater 137, contacts 136, switch arm 139, contact 140, contact 45, switch arm 49, switch arm 117, contact 121, relay coil 115, contacts 129 and bimetallic element 128 of the overload cut-out switching mechanism 127 and contacts 129 and bimetallic element 128 of the overload cut-out switching mechanism 126 back to the secondary 133. Completion of this circuit maintains the relay or starter 30 energized even though the space temperature should drop below 75°, or the suction pressure should drop below 50 pounds, or the high pressure should increase above 135 pounds. This maintaining circuit will therefore maintain the refrigerating apparatus in operation until the space temperature should decrease to the desired value of 73°, or until the suction pressure should decrease to 20 pounds, or until the high pressure should increase to 185 pounds whereupon the switch arm 49 is moved out of engagement with the contact 45. Whenever any of these last contingencies occur the relay coil 115 is deenergized to drop out the relay or starter 30 and stop operation of the compressor 20. In order to restart the refrigerating apparatus the space temperature must again rise to 75°, the suction pressure must rise to 50 pounds, and the high pressure must decrease to 135 pounds. By reason of the above control arrangement the refrigerating apparatus is operated to maintain the space temperature substantially between 73° and 75° and this operation is protected against current overload conditions in the refrigerating apparatus, high pressure conditions on the high pressure side of the refrigerating apparatus and low pressure conditions on the low pressure side of the refrigerating apparatus. Also if the fan motor 14 should be stopped either by manually opening the switch 32 or should be stopped by the occurrence of overload conditions, the refrigerating apparatus is shut down since there is no need for operating the refrigerating apparatus if the fan motor 14 is not operating. It is here noted that in order to restart the refrigerating apparatus the suction pressure must rise to some predetermined value, 50 pounds as illustrated, whereby the starting effort of the compressor motor is reduced.

From the above it is seen that this invention not only includes a novel switching mechanism but also applies the novel switching mechanism to an air conditioning apparatus for controlling the same in a novel manner. Although for purposes of illustration one form of this invention has been disclosed, other forms thereof may become apparent to those skilled in the art upon reference to this specification and therefore this invention is to be limited only by the scope of the appended claims and prior art.

We claim as our invention:

1. A control mechanism for a refrigerating apparatus including a relay for causing operation of the refrigerating apparatus when energized, a switching mechanism for energizing said relay, said switching mechanism including a pair of sequentially operated switches, connections between said switches and said relay to cause starting of the refrigerating apparatus when both switches are closed, to continue operation of the refrigerating apparatus after it has once started while one of the switches remains closed and to discontinue operation of the refrigerating apparatus when both switches are opened, and means for responding to suction pressure and high pressure for closing both switches only when the suction pressure rises above a predetermined value and the high pressure decreases below a predetermined value, for opening one of the switches when either the suction pressure decreases below or the high pressure increases above their respective values and for opening both switches when either the suction pressure decreases to a predetermined lower value or the high pressure increases to a predetermined higher value.

2. For use in a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, control means adapted to respond to said condition controlled by the evaporator, control means adapted to respond to the pressure on the high pressure side of the refrigerating apparatus, and mechanical means for operating the switch means by both of the control means to move the switch means to the starting position only when said condition increases to a predetermined high value and the pressure on the high pressure side decreases to a predetermined low value and to move the switch means to the stopping position when either said condition decreases to a predetermined low value or the pressure on the high pressure side increases to a predetermined high value, said mechanical means including devices responsive to the said condition of the medium and to said pressure, each device being arranged to actuate the switch means irrespective of the other of said devices.

3. For use in a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, control means adapted to respond to the condition controlled by the evaporator, control means adapted to respond to a condition which is a measure of evaporator temperature, and means for mechanically operating the switch means by both of the control means to move the switch means to the starting position only when the condition controlled by the evaporator increases to a predetermined high value and the evaporator temperature increases to a predetermined high value and to move the switch means to the stopping position when either the condition controlled by the evaporator decreases to a predetermined low value or the evaporator temperature decreases to a predetermined low value.

4. For use in a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, control means adapted to respond to the condition controlled by the evaporator, control means adapted to respond to the pressure on the high pressure side of the refrigerating apparatus, control means adapted to respond to a condition which is a measure of evaporator temperature, and means for mechanically operating the switch means by all of the control means to move the switch means to the starting position only when the condition controlled by the evaporator increases to a predetermined high value, the pressure on the high pressure side decreases to a predetermined low value and the evaporator temperature increases to a predetermined high value and to move the switch means to the stopping position when either the condition controlled by the evaporator decreases to a predetermined low value or the pressure on the high pressure side increases to a predetermined high value or the evaporator temperature decreases to a predetermined low value.

5. In a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, control means responsive to the condition controlled by the evaporator, control means responsive to the pressure on the high pressure side of the refrigerating apparatus, means for mechanically operating the switch means by both of the control means to move the switch means to the starting position only when the condition controlled by the evaporator increases to a predetermined high value and the pressure on the high pressure side decreases to a predetermined low value and to move the switch means to the stopping position when either the condition controlled by the evaporator decreases to a predetermined low value or the pressure on the high pressure side increases to a predetermined high value, means for adjusting the setting of the control means responsive to the condition controlled by the evaporator for operating the switch means at different values thereof, and means for adjusting the setting of the control means responsive to the pressure on the high pressure side for operating the switch means at different pressure values.

6. In a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, control means responsive to the condition controlled by the evaporator, control means responsive to a condition which is a measure of evaporator temperature, means for mechanically operating the switch means by both of the control means to move the switch means to the starting position only when the condition controlled by the evaporator increases to a predetermined high value and the evaporator temperature increases to a predetermined high value and to move the switch means to the stopping position when either the condition controlled by the evaporator decreases to a predetermined low value or the evaporator temperature decreases to a predetermined low value, means for adjusting the setting of the control means responsive to the condition controlled by the evaporator for operating the switch means at different values thereof, and means for adjusting the setting of the control means responsive to the condition which is a measure of evaporator temperature for operating the switch means at different temperature values.

7. In a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, control means responsive to the condition controlled by the evaporator, control means responsive to a condition which is a measure of evaporator temperature, means for mechanically operating the switch means by both of the control means to move the switch means to the starting position only when the condition controlled by the evaporator increases to a predetermined high value and the evaporator temperature increases to a predetermined high value and to move the switch means to the stopping position when either the condition controlled by the evaporator decreases to a predetermined low value or the evaporator temperature decreases to a predetermined low value, means for adjusting the setting of the control means responsive to the condition controlled by the evaporator for operating the switch means at different values thereof, means for adjusting the setting of the control means responsive to the condition which is a measure of evaporator temperature for operating the switch means at different temperature values, and means for adjusing the control means responsive to the condition which is a measure of evaporator temperature to adjust independently the temperature values at which the switch means is moved to the starting and stopping positions.

8. In a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, means for biasing the switch means towards the starting position, a first lever, means responsive to the condition controlled by the evaporator for moving the first lever to move the switch means against the action of the biasing means to the stopping position when the condition decreases to a predetermined low value, a second lever, and means responsive to a condition which is a measure of evaporator temperature for moving the second lever to move the switch means against the action of the biasing means to the stopping position when the evaporator temperature decreases to a predetermined low value, said levers being so arranged that the biasing means may move the switch means to the starting position only when the condition controlled by the evaporator increases to a predetermined high value and the evaporator temperature increases to a predetermined high value.

9. In a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, means for biasing the switch means towards the starting position, a first lever, means responsive to the condition controlled by the evaporator for moving the first lever to move the switch means against the action of the biasing means to the stopping position when the condition decreases to a predetermined low value, a second lever, and means responsive to the pressure on the high pressure side of the refrigerating apparatus for moving the second lever to move the switch means against the action of the biasing means to the stopping position when the pressure on the high presssure side increases to a predetermined high value, said levers being so arranged that the biasing means may move the switch means to the starting position only when the condition controlled by the evaporator increases to a predetermined high value and the pressure on the high pressure side decreases to a predetermined low value.

10. In a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, means for biasing the switch means towards the starting position, a first lever, means responsive to a condition which is a measure of evaporator temperature for moving the first lever to move the switch means against the action of the biasing means to the stopping position when the evaporator temperature decreases to a predetermined low value, a second lever, and means responsive to the pressure on the high pressure side of the refrigerating apparatus for moving the second lever to move the switch means against the action of the biasing means to the stopping position when the pressure on the high pressure side increases to a predetermined high value, said levers being so arranged that the biasing means may move the switch means to the starting position only when the evaporator temperature increases to a predetermined high value and the pressure on the high pressure side decreases to a predetermined low value.

11. In a control system for a refrigerating apparatus having an evaporator for controlling a condition affecting the heat content of a medium and an electrically operated mechanism for controlling the circulation of refrigerant through the evaporator, the combination of, switch means movable to a starting position to operate the electrically operated mechanism to circulate refrigerant through the evaporator and movable to a stopping position to interrupt the circulation of refrigerant through the evaporator, means for biasing the switch means towards the starting position, a first lever, means responsive to the condition controlled by the evaporator for moving the first lever to move the switch means against the action of the biasing means to the stopping position when the condition decreases to a predetermined low value, a second lever, means responsive to a condition which is a measure of evaporator temperature for moving the second lever to move the switch means against the action of the biasing means to the stopping position when the evaporator temperature decreases to a predetermined low value, a third lever, and means responsive to the pressure on the high pressure side of the refrigerating apparatus for moving the third lever to move the switch means against the action of the biasing means to the stopping position when the pressure on the high pressure side increases to a predetermined high value, said levers being so arranged that the biasing means may move the switch means to the starting position only when the condition controlled by the evaporator increases to a predetermined high value, the evaporator temperature increases to a predetermined high value and the pressure on the high pressure side decreases to a predetermined low value.

12. A control mechanism for a refrigerating apparatus which controls a condition affecting the heat content of a medium, including a relay for causing operation of the refrigerating apparatus when energized, a switching mechanism for energizing said relay, said switching mechanism including a pair of sequentially operated switches, connections between said switches and said relay to cause starting of the refrigerating apparatus when both switches are closed, to continue operation of the refrigerating apparatus after it has once started while one of the switches remains closed and to discontinue operation of the refrigerating apparatus when both switches are opened, and means adapted to respond to the condition controlled by the refrigerating apparatus, the high pressure of the refrigerating apparatus and the suction pressure of the refrigerating apparatus for closing both switches only when the condition controlled by the refrigerating apparatus increases above a predetermined value, the high pressure decreases below a predetermined value and the suction pressure increases above a predetermined value, for opening one of the switches when either the condition controlled by the refrigerating apparatus decreases below the predetermined value or the high pressure increases above the predetermined value or the suction pressure decreases below the predetermined value and for opening both switches when either the condition controlled by the refrigerating apparatus decreases to a predetermined lower value or the high pressure increases to a predetermined higher value or the suction pressure decreases to a predetermined lower value.

13. In combination, switch means adapted to be moved between first and second positions, means for biasing the switch means towards the first position, a first lever, means responsive to a variable condition capable of having measurable values for advancing the first lever to move the switch means against the action of the biasing means to the second position, a second lever, means responsive to a variable condition capable of having measurable values for advancing the second lever to move the switch means against the action of the biasing means to the second position, the arrangement being such that the biasing means may move the switch means to the first position only when both levers are retracted sufficiently by their condition responsive means, and adjustable abutment means interposed between the levers and the switch means to vary the values of the conditions required to operate the switch means.

14. In combination, switch means adapted to be moved between first and second positions, means for biasing the switch means towards the first position, a first lever, a first means responsive to a variable condition capable of having measurable values including an expansible and contractible element for advancing the first lever to move the switch means against the action of the biasing means to the second position and spring means for opposing the operation of the expansible and contractible element, a second lever, a second means responsive to a variable condition capable of having measurable values including an expansible and contractible element for advancing the second lever to move the switch means against the action of the biasing means to the second position and spring means for opposing the operation of the expansible and contractible element, the arrangement being such that the biasing means may move the switch means to the first position only when both levers are retracted sufficiently by their condition responsive means, and means for adjusting the spring means of the condition responsive means to vary the values of the conditions required to operate the switch means.

15. In combination, switch means adapted to be moved between first and second positions, means for biasing the switch means towards the first position, a first lever, a first means responsive to a variable condition capable of having measurable values including an expansible and contractible element for advancing the first lever to move the switch means against the action of the biasing means to the second position and spring means for opposing the operation of the expansible and contractible element, a second lever, a second means responsive to a variable condition capable of having measurable values including an expansible and contractible element for advancing the second lever to move the switch means against the action of the biasing means to the second position and spring means for opposing the operation of the expansible and contractible element, the arrangement being such that the biasing means may move the switch means to the first position only when both levers are retracted sufficiently by their condition responsive means, and means for adjusting the spring means of the condition responsive means to adjust the values of the conditions required to operate the switch means, and adjustable abutment means interposed between the levers and the switch means also to vary the values of the conditions required to operate the switch means.

16. In combination, switch means adapted to be moved between first and second positions, means for biasing the switch means toward the first position, at least three levers, each adapted to move the switch means against the action of the biasing means to the second position upon advancement thereof, and means responsive to a condition having measurable values for each lever for advancing and retracting the same, the arrangement being such that any lever upon advancement may move the switch means to the second position while the biasing means may move the switch means to the first position only when all of the levers are retracted.

17. In combination, switch means adapted to be moved between first and second positions, means for biasing the switch means toward the first position, at least three levers, each adapted to move the switch means against the action of the biasing means to the second position upon advancement thereof, a means responsive to a variable condition capable of having measurable values for each lever for advancing and retracting the same, the arrangement being such that any lever upon advancement may move the switch means to the second position while the biasing means may move the switch means to the first position only when all of the levers are retracted, and adjustable abutment means interposed between the levers and the switch means to vary the values of the conditions required to operate the switch means.

18. In combination, switch means adapted to be moved between first and second positions, means for biasing the switch means toward the first position, at least three levers, each adapted to move the switch means against the action of the biasing means to the second position upon advancement thereof, a means responsive to a variable condition capable of having measurable values for each lever including an expansible and contractible element for advancing and retracting the lever and spring means for opposing the operation of the expansible and contractible element, the arrangement being such that any lever upon advancement may move the switch means to the second position while the biasing means may move the switch means to the first position only when all of the levers are retracted, and means for adjusting the spring means of the condition responsive means to vary the values of the conditions required to operate the switch means.

19. In combination, switch means adapted to be moved between first and second positions, means for biasing the switch means toward the first position, at least three levers, each adapted to move the switch means aaginst the action of the biasing means to the second position upon advancement thereof, a means responsive to a variable condition capable of having measurable values for each lever including an expansible and contractible element for advancing and retracting the lever and spring means for opposing the operation of the expansible and contractible element, the arrangement being such that any lever upon advancement may move the switch means to the second position while the biasing means may move the switch means to the first position only when all of the levers are retracted, means for adjusting the spring means of the condition responsive means to vary the values of the conditions required to operate the switch means, and adjustable abutment means interposed between the levers and the switch means also to vary the values of the conditions required to operate the switch means.

20. In a refrigerant system controller, switch means in control of a refrigerant compressor motor and having spaced cut-in and cut-out positions, a pair of devices adapted to respond respectively to air temperature in the space being refrigerated and to low side pressure, said responsive devices each being operable independent of the other one to move said switch means to cut-out position and both of said responsive devices being associated with said switch means so that both must be in their cut-in positions to permit movement of said switch means to its cut-in position.

21. In a control device for a refrigerating system, switch means, a first means adapted to respond to pressure in the system and a second means adapted to respond to the temperature of the space being refrigerated, said first and second means cooperating with said switch means to operate the same and the cooperation being such as to cause the switch means to assume cut-out position in direct response to and movement of either the first or second means whichever first assumes cut-out position, and to cause said switch means to assume cut-in position only when both of said means are in their cut-in positions.

22. In a control device for a refrigerating system, switch means, a first means adapted to respond to pressure in the low side conduit of the system and a second means adapted to respond to the temperature of the space being refrigerated, said first and second means each cooperating with said switch means to cause it to assume cut-out position in response to either the first or second means, whichever first assumes cut-out position, and to cause said switch means to assume cut-in position only after both of said responsive means have returned to their respective cut-in positions.

23. A control mechanism for a refrigerating apparatus; said mechanism including a relay for controlling the supply of power thereto, and a switching mechanism; said switching mechanism including a pair of sequentially operated switches arranged to close in one order and to open in the reverse order, a device adapted to respond to changes in the value of a psychrometric condition of the medium affected by said refrigerating apparatus, a pressure operated device, means adapted to connect the same to the suction line of said refrigerating apparatus, connecting means associated with said devices and being so arranged with respect to said switches as to cause the latter to open in said reverse order as the values of said psychrometric condition fall through a predetermined range; or as the values of the pressure affecting said pressure operated device fall through a predetermined range; and electrical connections between said switches and relay for energizing said relay when both switches are closed, said electrical connections including means operated by said relay when energized to close a holding circuit for the relay through the last switch to open.

24. A control mechanism for a refrigerating apparatus; said mechanism including a relay for controlling the supply of power thereto, and a switching mechanism; said switching mechanism including a pair of sequentially operated switches arranged to close on one order and open in the reverse order, a device adapted to respond to changes in the value of a psychrometric condition of the medium affected by said refrigerating apparatus, a pressure operated device, means for connecting said pressure operated device to the high pressure side of said refrigerating apparatus, connecting means associated with said devices and being so arranged with respect to said switches as to cause the latter to open in said reverse order as the values of the psychrometric condition fall through a predetermined range, or as the values of the pressure affecting the pressure operated device rise through a predetermined range, and electrical connections between said switches and relay for energizing said relay when both switches are closed, said electrical connections including means operated by said relay when energized to close a holding circuit for said relay through the last switch to open.

25. A control mechanism for a refrigerating apparatus; said mechanism including a relay for controlling the supply of power thereto, and a switching mechanism; said switching mechanism including a pair of sequentially operated switches arranged to close in one order and open in the reverse order, a device adapted to respond to changes in the value of a psychrometric condition of the medium affected by said refrigerating apparatus, a first pressure operated device, means adapted to connect the same to the suction line of said refrigerating apparatus, a second pressure operated device, means for connecting said second pressure operated device to the high pressure side of said refrigerating apparatus, connecting means associated with said devices and being so arranged with respect to said switches as to cause the latter to open in said reverse order as the values of said psychrometric condition fall through a predetermined range, or as the values of the pressure affecting the first mentioned device fall through a predetermined range, or as the values of the pressure of the second device rise through a predetermined range, and electrical connections between said switches and relay for energizing said relay when both switches are closed, said electrical connections including means operated by said relay when energized to close a holding circuit for said relay through the last switch to open.

CARL G. KRONMILLER.
WALTER E. EDELMAN.